United States Patent [19]

Hong

[11] Patent Number: 5,373,328
[45] Date of Patent: Dec. 13, 1994

[54] APPARATUS FOR SEPARATING LUMINANCE AND COLOR SIGNALS BY DETECTING THE HORIZONTAL AND VERTICAL VARIATIONS

[75] Inventor: Sung H. Hong, Seoul, Rep. of Korea

[73] Assignee: Goldstar Co., Ltd., Seoul, Rep. of Korea

[21] Appl. No.: 99,162

[22] Filed: Jul. 29, 1993

[30] Foreign Application Priority Data

Jul. 31, 1992 [KR] Rep. of Korea ............... 1992-13778

[51] Int. Cl.$^5$ ............................................. H04N 9/78
[52] U.S. Cl. ..................................... 348/668; 348/666
[58] Field of Search ............... 358/31, 21 R; 348/663, 348/664, 665, 666, 667, 668, 669, 670; H04N 9/535, 9/78

[56] References Cited

U.S. PATENT DOCUMENTS

| | | | |
|---|---|---|---|
| 4,688,080 | 8/1987 | Wagner | 358/31 |
| 4,893,176 | 1/1990 | Faroudja | 358/31 |
| 4,994,906 | 2/1991 | Moriwake | 358/31 |
| 5,194,942 | 4/1993 | Sim et al. | 358/31 |

*Primary Examiner*—Victor R. Kostak
*Assistant Examiner*—Nathan J. Flynn
*Attorney, Agent, or Firm*—Fliesler, Dubb, Meyer & Lovejoy

[57] ABSTRACT

An apparatus for separating luminance and color signals from a composite video signal, which is capable of suppressing a cross luminance phenomenon of the luminance signal and a cross color phenomenon of the color signal. The apparatus comprises a first color signal detecting circuit for detecting a first color signal from the composite video signal, the first color signal suppressing a cross luminance phenomenon of the luminance signal from the composite video signal, and a second color signal detecting circuit for detecting a second color signal from the composite video signal, the second color signal suppressing a cross color phenomenon of the color signal from the composite video signal. The first color signal is selected when the color signal of the composite video signal has a large amplitude and no diagonal variation. The second color signal is selected when the color signal of the composite video signal has a small amplitude and the diagonal variation. Therefore, a definition of the picture can be obtained by suppressing the cross color phenomenon of the color signal and the cross luminance phenomenon of the luminance signal.

9 Claims, 7 Drawing Sheets

FIG 8.B

APPARATUS FOR SEPARATING LUMINANCE AND COLOR SIGNALS BY DETECTING THE HORIZONTAL AND VERTICAL VARIATIONS

BACKGROUND OF THE INVENTION

1. Field of the Invention

The present invention relates in general to an orthogonal television receiver for receiving a composite video signal in which a color signal is interleaved in a luminance signal, and more particularly to an apparatus for separating luminance and color signals from a composite video signal, which is capable of suppressing a cross luminance phenomenon of the luminance signal and a cross color phenomenon of the color signal, the cross luminance phenomenon being a dot interference phenomenon which occurs in the luminance signal, the cross color phenomenon being a rainbow pattern color spread phenomenon which occurs in the case where the composite video signal has a diagonal variation.

2. Description of the Prior Art

To use efficiently a limited frequency band in a general orthogonal modulation color television broadcasting system, a composite video signal in which a color signal is interleaved in a luminance signal is transmitted to an orthogonal color television receiver, which separates the luminance and color signals from the transmitted composite video signal.

The color television receiver may imperfectly separate the luminance and color signals from the composite video signal. This imperfect separation of the luminance and color signals causes dot interference and color spread phenomenons, resulting in a degradation in a picture quality.

In order to remove the dot interference and color spread phenomenons due to the imperfect separation of the luminance and color signals, a conventional NTSC system first extracts the color signal from the composite video signal using a characteristic of the color signal of being 180° out of phase every line and then extracts the luminance signal from the composite video signal by removing the extracted color signal. A conventional apparatus for separating the luminance and color signals from the composite video signal in this manner will hereinafter be described in detail with reference to FIG. 1.

Referring to FIG. 1, there is shown a block diagram of the conventional apparatus for separating the luminance and color signals from the composite video signal. As shown in this drawing, the conventional apparatus comprises a line comb filter 1 for extracting the color signal from the composite video signal CV, a band pass filter 2 for extracting a frequency component around a chrominance subcarrier from the extracted color signal from the line comb filter 1 and outputting the resultant color signal C, a delay 3 for delaying the composite video signal CV so that the composite video signal CV and the color signal C from the band pass filter 2 are in phase, and a subtracter 4 for subtracting the color signal C from the band pass filter 2 from the delayed composite video signal CV from the delay 3 to output the luminance signal Y.

In operation, the color signal is extracted from the composite video signal CV in the line comb filter 1 and then applied in the band pass filter 2. The band pass filter 2 acts to extract the frequency component around the chrominance subcarrier from the extracted color signal from the line comb filter 1 and output the resultant color signal C. The composite video signal CV is also delayed by a predetermined period of time by the delay 3, so that it is in phase with the color signal from the band pass filter 2, and then applied to the subtracter 4, which is also applied with the, color signal C from the band pass filter 2. As a result, the subtracter extracts the luminance signal Y by subtracting the color signal C from the band pass filter 2 from the delayed composite video signal CV from the delay 3.

In the above-mentioned conventional apparatus for separating the luminance and color signals from the composite video signal, however, there is a trade-off between a resolution and a cross-talk resulting from the separated luminance and color signals. Namely, setting widely a band width of the frequency component around the chrominance subcarrier in the extraction of the color signal, the resolution of the color signal is increased, while a probability that a cross color phenomenon of the color signal occurs is increased. Also, in the case where the composite video signal has a diagonal variation or the color signal thereof has a small amplitude, the degradation in the picture quality is greatly influenced by the color spread phenomenon resulting from the cross color phenomenon rather than a reduction in the resolution of the color signal. On the other hand, the degradation in the picture quality is greatly influenced by a reduction in the resolution of the luminance signal rather than a cross luminance phenomenon of the luminance signal.

The line comb filter with a sharp cut-off characteristic is used to remove the cross color phenomenon of the color signal in the separation of the luminance and color signals in the conventional apparatus. However, if the frequency band width of the band pass filter is widely set, there is increased a probability that the color signal interferes with the luminance signal. Also, if the frequency band widths of the line comb filter and the band pass filter are widely set, the resolution of the luminance signal is reduced and the cross color phenomenon of the color signal takes place.

To solve these problems, a luminance/color signals separating apparatus shown in U.S. Pat. No. 4,864,398 comprises 1 horizontal line (H) and 2H comb filters and a band pass filter to extract the color signal from the composite video signal. However, in this apparatus, a dot crawling phenomenon may take place due to an instability of the band pass filter when the composite video signal has a horizontal variation. Also, this apparatus cannot cope with the case where three lines of the composite video signal all have variations. Further, the cross color phenomenon of the color signal occurs greatly when the composite video signal has the diagonal variation.

Another luminance/color signals separating apparatus is shown in U.S. Pat. No. 4,893,176. This apparatus is adapted to extract the luminance and color signals from the composite video signal by varying operating characteristics of 6H and 2H comb filters which are used to extract the color signal. However, in this apparatus, it is difficult to remove the cross luminance phenomenon which takes place when the composite video signal has two or three line variations.

SUMMARY OF THE INVENTION

Therefore, the present invention has been made in view of the above problems, and it is an object of the present invention to provide an apparatus for separating luminance and color signals from a composite video signal, which is capable of suppressing a cross luminance phenomenon of the luminance signal and a cross color phenomenon of the color signal.

In accordance with the present invention, the above and other objects can be accomplished by a provision of an apparatus for separating luminance and color signals from a composite video signal, comprising: first control means for detecting vertical and horizontal variations of the composite video signal and outputting first and second controls signal for extracting the color signal from the composite video signal in accordance with the detected result; first color signal detecting means for detecting a first color signal from the composite video signal in-response to the first and second control signals from said first control means, the first color signal suppressing a cross luminance phenomenon of the luminance signal from the composite video signal; second color signal detecting means for detecting a second color signal from the composite video signal, tile second color signal suppressing a cross color phenomenon of the color signal from the composite video signal; second control means for detecting an amplitude and a diagonal variation of the color signal in the composite video signal and outputting a third control signal in accordance with the detected result; multiplexing means responsive to the third control signal from said second control means for selecting the first color signal from said first color signal detecting means when the color signal of the composite video signal has a large amplitude and no diagonal variation and selecting the second color signal from said second color signal detecting means when the color signal of the composite video signal has a small amplitude and the diagonal variation; subtracting means for subtracting the first color signal from said first color signal detecting means from the composite video signal and outputting the resultant luminance signal; and delay means for delaying the luminance signal from said subtracting means to match it with the color signal from said multiplexing means.

BRIEF DESCRIPTION OF THE DRAWINGS

The above and other objects, features and advantages of the present invention will be more clearly understood from the following detailed description taken in conjunction with the accompanying drawings, in which:

FIGS. 8A and 8B are amplitude-frequency diagrams illustrating frequency characteristics of filters in the first and second control circuits, respectively.

DETAILED DESCRIPTION OF THE PREFERRED EMBODIMENTS

Figure 1:
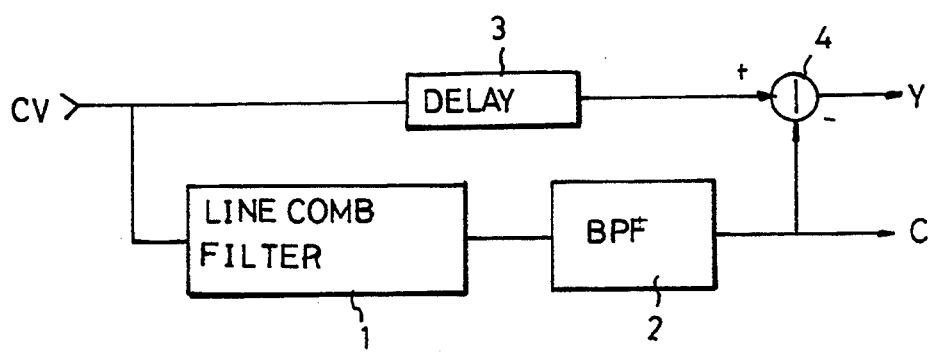
FIG. 1 is a block diagram of a conventional apparatus for separating luminance and color signals from a composite video signal.
Figure 2:
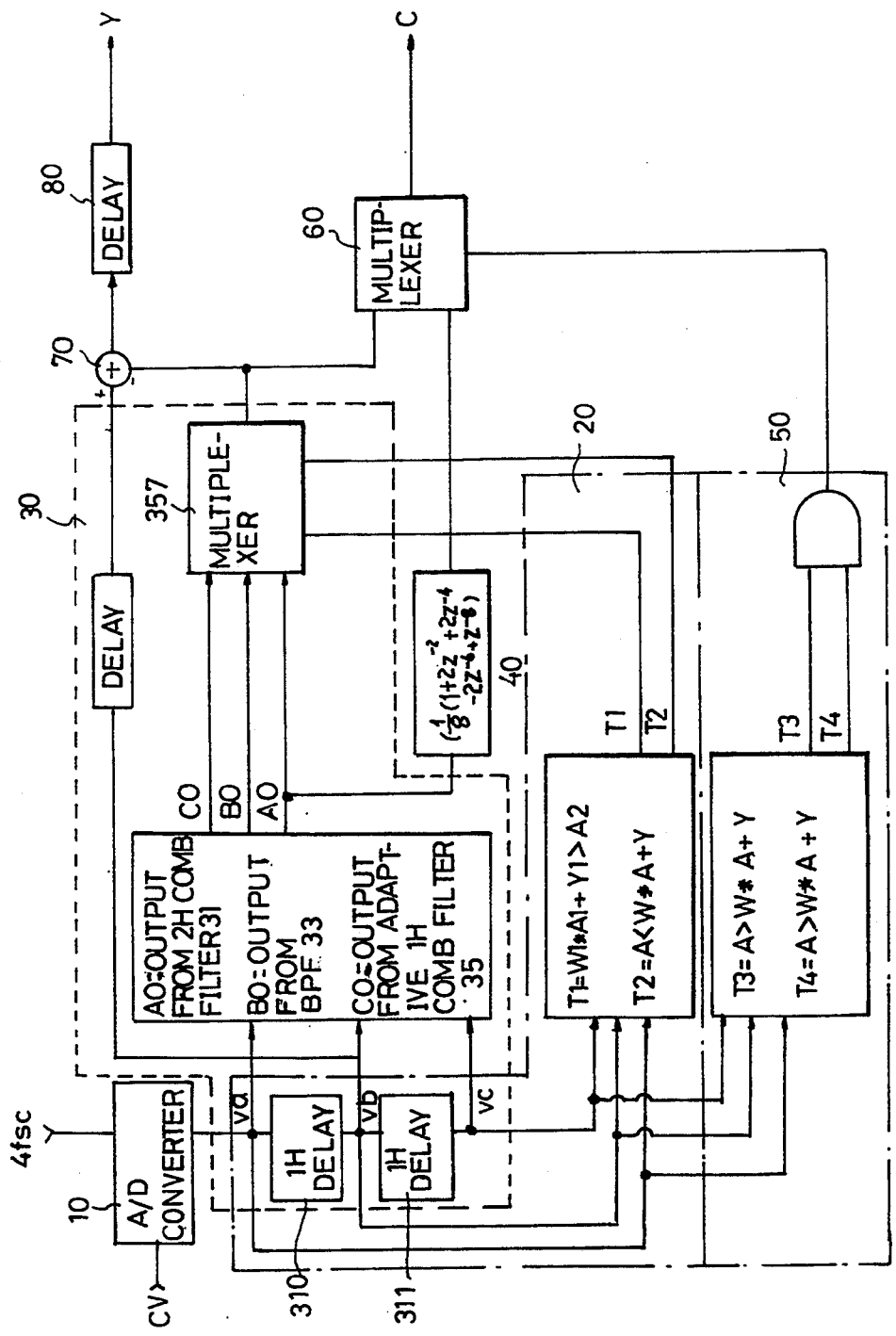
FIG. 2 is a block diagram of an apparatus for separating luminance and color signals from a composite video signal in accordance with the present invention.

Referring to FIG. 2, there is shown a block diagram of an apparatus for separating luminance and color signals from a composite video signal in accordance with the present invention. As shown in this figure, the apparatus comprises an analog/digital converter 10 for converting the composite video signal inputted therein into a digital signal, a first control circuit 20 for detecting vertical and horizontal variations of the composite video signal and outputting first and second controls signal for extracting the color signal from the composite video signal in accordance with the detected result, a first color signal detecting circuit 30 for detecting a first color signal from the composite video signal in response to the first and second control signals from the first control circuit 20, the first color signal suppressing a cross luminance phenomenon of the luminance signal from the composite video signal, and a second color signal detecting circuit 40 for detecting a second color signal from the composite video signal, the second color signal suppressing a cross color phenomenon of the color signal from the composite video signal.

A second control circuit 50 is also provided in the apparatus to detect an amplitude and a diagonal variation of the color signal in the composite video signal and output a third control signal in accordance with the detected result. A multiplexer 60 is operative responsive to the third control signal from the second control circuit 50 to select the first color signal from the first color signal detecting circuit 30 when the color signal of the composite video signal has a large amplitude and no diagonal variation and select the second color signal from the second color signal detecting circuit 40 when the color signal of the composite video signal has a small amplitude and the diagonal variation.

The luminance/color signals separating apparatus of the present invention also comprises a subtracter 70 for subtracting the first color signal from the first color signal detecting circuit 30 from the composite video signal and outputting the resultant luminance signal Y, and a delay 80 for delaying the luminance signal Y from the subtracter 70 to match it with the color signal C from the multiplexer 60.

Figure 3:
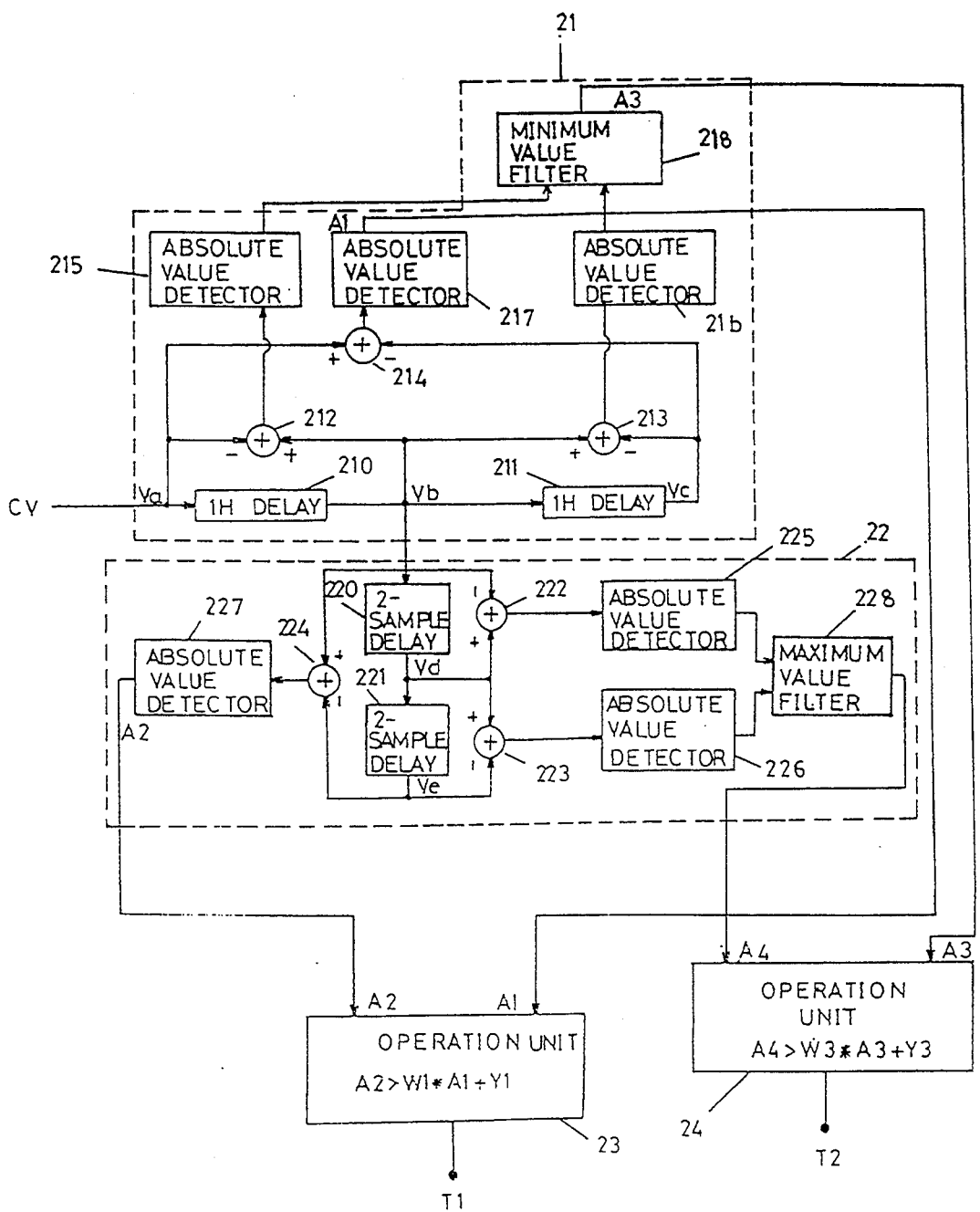
FIG. 3 is a detailed block diagram of a first control circuit in the apparatus in FIG. 2.

Referring to FIG. 3, there is shown a detailed block diagram of the first control circuit 20 in the apparatus in FIG. 2. As shown in this drawing, the first control circuit 20 includes a vertical variation detecting circuit 21 for detecting the vertical variation of the composite video signal, a horizontal variation detecting circuit 22 for detecting the horizontal variation of the composite video signal, an operation unit 23 for receiving first output signals A1 and A2 from the vertical and horizontal variation detecting circuits, detecting whether the vertical variation of the composite video signal is smaller than the horizontal variation thereof, in response to the received signals A1 and A2, and outputting the first control signal in accordance with the detected result, and an operation unit 24 for receiving second output signals A3 and A4 from the vertical and horizontal variation detecting circuits, detecting whether the horizontal variation of the composite video signal is smaller than the vertical variation thereof, in response to the received signals A3 and A4, and outputting the second control signal in accordance with the detected result.

The vertical variation detecting circuit 21 includes 1H delays 210 and 211, subtracters 212–214, absolute value detectors 215–217 and a minimum value filter 218. The horizontal variation detecting circuit 22 includes 2-sample delays 220 and 221, subtracters 222–224, absolute value detectors 225–227 and a maximum value filter 228.

Figure 4:
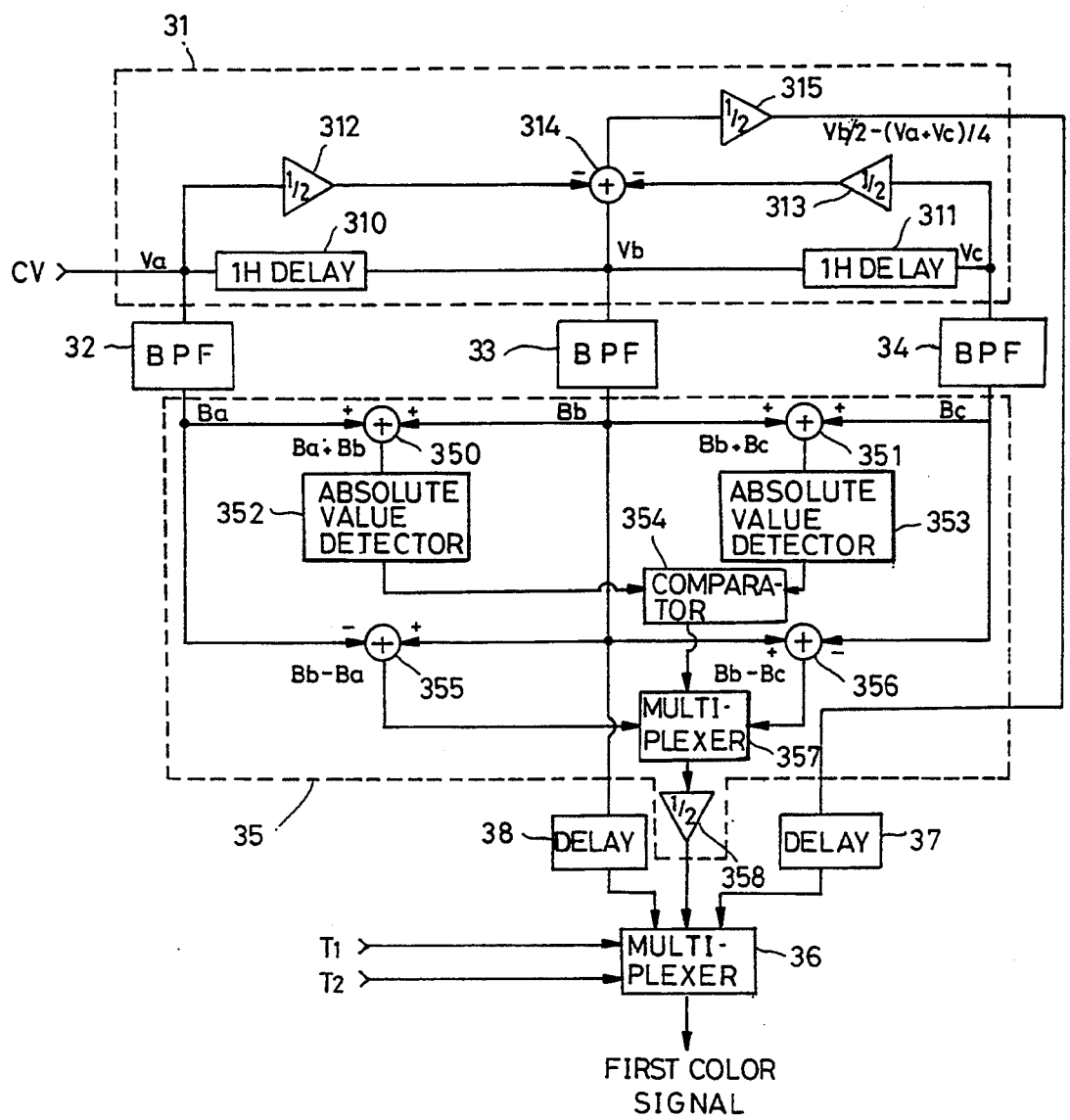
FIG. 4 is a detailed block diagram of a first color signal detecting circuit in the apparatus in FIG. 2.

Referring to FIG. 4, there is shown a detailed block diagram of the first color signal detecting circuit 30 in the apparatus in FIG. 2. As shown in this drawing, the first color signal detecting circuit 30 includes a 2H comb filter 31 for comb-filtering the composite video signal by 2H and outputting the resultant color signal, band pass filters 32–34 each for extracting a frequency component around a chrominance subcarrier from a corresponding one of the composite video signal, a 1H delayed composite video signal and a 2H delayed composite video signal and outputting the resultant color signal, an adaptive 1H comb filter 35 for outputting one of the color signals from the band pass filters 32, 33 and 34 having a high line correlation, and a multiplexer 36 responsive to the first and second control signals from the first control circuit 20 for selecting the color signal from the 2H comb filter 31 when the vertical variation of the composite video signal is smaller than the horizontal variation thereof, the color signal from the band pass filter 33 when the horizontal variation of the composite video signal is smaller than the vertical variation thereof or when a correlation of three lines is low vertically and high horizontally and the color signal from the adaptive 1H comb filter 35 in other cases, and outputting the selected color signal as the first color signal.

Also, the first color signal detecting circuit 30 includes delays 37 and 38 for delaying the color signal from the 2H comb filter 31 and the color signal from the band pass filter 38, respectively, to match them with the color signal from the adaptive 1H comb filter 35.

The 2H comb filter 31 includes 1H delays 310 and 311, ½ amplifiers 312, 313 and 315 and a subtracter 314. The adaptive 1H comb filter 35 includes adders 350 and 351, absolute value detectors 352 and 353, a comparator 354, subtracters 355 and 356, a multiplexer 357 and a ½ amplifier 358.

The second color signal detecting circuit 40, as shown in FIG. 2, includes a band pass filter for suppressing the cross color phenomenon of the color signal from the 2H comb filter 31 in the first color signal detecting circuit 30 and outputting the resultant color signal as the second color signal.

Figure 5:
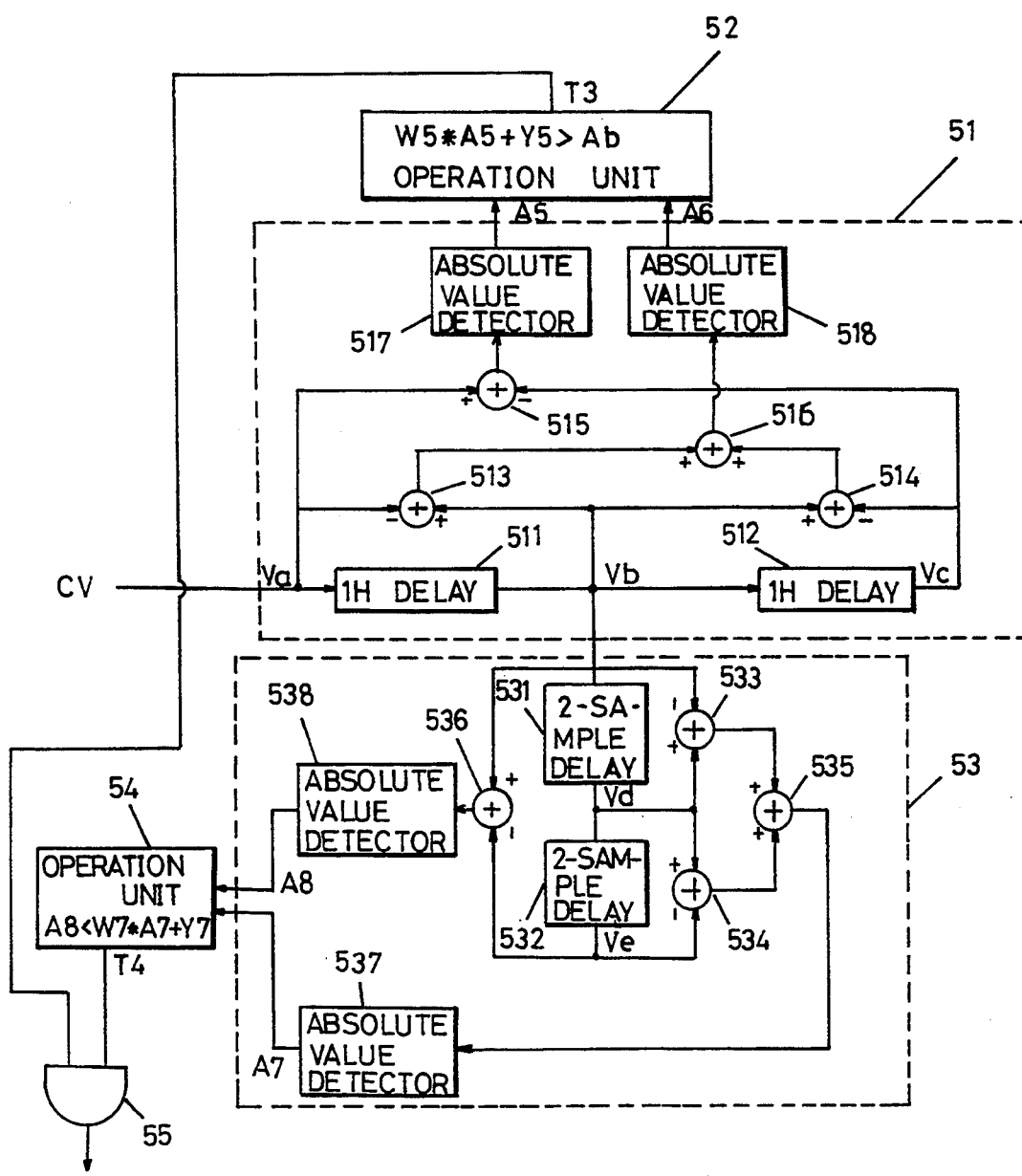
FIG. 5 is a detailed block diagram of a second control circuit in the apparatus in FIG. 2.

Referring to FIG. 5, there is shown a detailed block diagram of the second control circuit 50 in the apparatus in FIG. 2. As shown in this drawing, the second control circuit 50 includes a vertical variation detecting circuit 51 for detecting the vertical variation of the composite video signal, an operation unit 52 for detecting the amplitude of the color signal being vertically varied, in response to output signals A5 and A6 from the vertical variation detecting circuit 51, a horizontal variation detecting circuit 53 for detecting the horizontal variation of the composite video signal, an operation unit 54 for detecting the amplitude of the color signal being horizontally varied, in response to output signals A7 and A8 from the horizontal variation detecting circuit 51, and an AND gate 55 for ANDing output signals from the operation units 52 and 54 and outputting the ANDed signal as the third control signal.

The vertical variation detecting circuit 51 includes 1H delays 511 and 512, subtracters 513–515, an adder 516 and absolute value detectors 517 and 518. The horizontal variation detecting circuit 53 includes 2-sample delays 531 and 532, subtracters 533, 534 and 536, an adder 535 and absolute value detectors 537 and 538.

The operation of the luminance/color signals separating apparatus with the above-mentioned construction in accordance with the present invention will hereinafter be described in detail with reference to FIGS. 2 to 8B.

First, the input composite video signal CV is converted into the digital composite video signal Va by the analog/digital converter 10 and then applied to the vertical variation detecting circuit 21 in the first control circuit 20. In the vertical variation detecting circuit 21, the composite video signal Va is sequentially delayed by 1H by the 1H delays 210 and 211. Then, the composite video signal Va is subtracted from an output signal Vb from the 1H delay 210 by the subtracter 212 and an output signal Vc from the 1H delay 211 is subtracted from the output signal Vb from the 1H delay 210 by the subtracter 213. The subtracter 214 subtracts the output signal Vc from the 1H delay 211 from the composite video signal Va and then outputs the resultant signal Va−Vc. The absolute value detectors 215–217 detect absolute values of the output signals Vb−Va, Vb−Vc and Va−Vc from the subtracters 212–214, respectively. A smaller one of output signals from the absolute value detectors 215 and 216 is filtered by the minimum value filter 218.

The output signal Vb from the 1H delay 210 is also sequentially delayed by 2-sample by the 2-sample delays 220 and 221 in the horizontal variation detecting circuit 22. The subtracter 220 subtracts the output signal Vb from the 1H delay 210 from an output signal Vd from the 2-sample delay 220 and then outputs the resultant signal Vd−Vb. Also, the subtracter 223 subtracts an output signal Ve from the 2-sample delay 221 from the output signal Vd from the 2-sample delay 220 and then outputs the resultant signal Vd−Ve. Then, the subtracter 224 subtracts the output signal Ve from the 2-sample delay 221 from the output signal Vb from the 1H delay 210 and then outputs the resultant signal Vb−Ve. The absolute value detectors 225–227 detect absolute values of the output signals Vd−Vb, Vd−Ve and Vb−Ve from the subtracters 222–224, respectively. A larger one of output signals from the absolute value detectors 225 and 226 is filtered by the maximum value filter 228.

An output signal A1 from the absolute value detector 217 in the vertical variation detecting circuit 21 and an output signal A2 from the absolute value detector 227 in the horizontal variation detecting circuit 22 are compared with each other by the operation unit 23. Also, an output signal A3 from the minimum value filter 218 in the vertical variation detecting circuit 21 and an output signal A4 from the maximum value filter 228 in the horizontal variation detecting circuit 22 are compared with each other by the operation unit 24.

Figure 6:
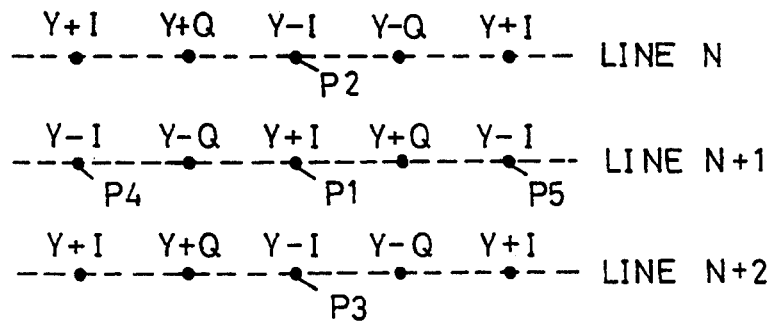
FIG. 6 is a view illustrating an array of data of a composite video signal which is shown on a screen.

In the case where the reference numerals P1–P5 designate data Y+I and Y−I in the three lines N, N+1 and N+2 of the composite video signal as shown in FIG. 6, the output signals A1 and A2 from the absolute value detectors 217 and 227 and the output signals A3 and A4 from the minimum value and maximum value filters 218 and 228 can be expressed by the following equations:

$$A1 = |Va - Vc| = |P2 - P3|$$

$$A2=|Vb-Ve|=|P4-P5|$$

$$A3=\text{MIN}(|Vb-Va|, |Vb-Vc|)=\text{MIN}(|P1-P2|, |P1-P3|)$$

$$A4=\text{MAX}(|Vd-Vb|, |Vd-Ve|)=\text{MAX}(|P1-P4|, |P1-P5|)$$

Upon receiving the output signals A1 and A2 from the absolute value detectors 217 and 227, the operation unit 23 calculates $A2 > W1 \times A1 + Y1$, where W1 is a weighted value for A1, and then outputs the first control signal T1 in accordance with the calculated result. The equation $A2 > W1 \times A1 + Y1$ means that the vertical variation of the composite video signal is smaller than the horizontal variation thereof. In this case, provided that W1 and Y1 are large, the vertical variation of the composite video signal is very smaller than the horizontal variation thereof.

Also, upon receiving the output signals A3 and A4 from the minimum value and maximum value filters 218 and 228, the operation unit 24 calculates $A3 > W3 \times A4 + Y3$, where W3 is a weighted value for A3, and then outputs the second control signal T2 in accordance with the calculated result. The equation $A3 > W3 \times A4 + Y3$ means that the correlation of the three lines are low. In this case, provided that W3 and Y3 are large, the horizontal variation of the composite video signal is very smaller than the vertical variation thereof.

On the other hand, the composite video signal Va is sequentially delayed by 1H by the 1H delays 310 and 311 in the first color signal detecting circuit 30. The composite video signal Va is also amplified by the ½ amplifier 312 and an output signal Vc from the 1H delay 311 is amplified by the ½ amplifier 313. Output signals (Va+Vc)/2 from the ½ amplifiers 312 and 313 are subtracted from an output signal Vb from the 1H delay 310 by the subtracter 314. As a result, the subtracter 314 outputs a signal Vb−(Va+Vc)/2.

The ½ amplifier 315 amplifies the output signal Vb−(Va+Vc)/2 from the subtracter 314 and outputs the resultant signal Vb/2−(Va+Vc)/4 to the multiplexer 36 through the delay 37.

Each band pass filters 32–34 extracts the frequency component around the chrominance subcarrier of, for example, 3.58 MHz for a NTSC television broadcasting system, from the corresponding one of the composite video signal Va, the 1H delay composite video signal and the 2H delayed composite video signal and outputs the resultant excellent color signal Ba, Bb or Bc. The color signal Bb from the band pass filter 33 is applied to the multiplexer 36 through the delay 38.

In the adaptive 1H comb filter 35, the adder 350 adds the color signal Bb from the band pass filter 33 to the color signal Ba from the band pass filter 32 and outputs the resultant signal Ba+Bb. Also, the adder 351 adds the color signal Bc from the band pass filter 34 to the color signal Bb from the band pass filter 33 and outputs the resultant signal Bb+Bc. Absolute values of the output signals Ba+Bb and Bb+Bc are detected by the absolute value detectors 352 and 353, respectively. The comparator 354 compares output signals from the absolute value detectors 352 and 353 with each other and outputs the compared result to the multiplexer 357.

The color signals Ba, Bb and Bc from the band pass filters 32–34 are also applied to the subtracters 355 and 356. The subtracter 355 subtracts the color signal Bb from the band pass filter 33 from the color signal Ba from the band pass filter 32 and then outputs the resultant signal Ba−Bb. The subtracter 356 subtracts the color signal Bc from the band pass filter 34 from the color signal Bb from the band pass filter 33 and then outputs the resultant signal Bb−Bc. The output signals Ba−Bb and Bb−Bc from the subtracters 355 and 356 are applied to the multiplexer 357 which is also applied with the output signal from the comparator 354.

Noticeably, since the color signal is 180° out of phase every line in the NTSC television system, a smaller one of the output signals Ba+Bb and Bb+Bc from the adders 350 and 351 has a higher correlation. As a result, the multiplexer 357 is controlled depending on the output signal from the comparator 354 which compares the output signals from the absolute value detectors 352 and 353 with each other. Namely, in response to the output signal from the comparator 354, the multiplexer 357 selects one of the output signals Ba−Bb and Bb−Bc from the subtracters 355 and 356 having the higher line correlation.

For example, if the color signal Bb+Ba from the adder 350 is greater than the color signal Bc+Bb from the adder 351, the multiplexer 357 selects the color signal Bb−Bc from the subtracter 356. On the contrary, if the color signal Bc+Bb from the adder 351 is greater than the color signal Bb+Ba from the adder 350, the multiplexer 357 selects the color signal Bb−Ba from the subtracter 355. The color signal selected by the multiplexer 357 is amplified by a predetermined level by the ½ amplifier 358 and then applied to the multiplexer 36.

The multiplexer 36 inputs the color signal from the 2H comb filter 31, the color signal from the band pass filter 33 and the color signal from the adaptive 1H comb filter 35 and selects one of the inputted color signals as the first color signal in response to the first and second control signals T1 and T2 from the first control circuit 20.

Namely, when the first and second control signals T1 and T2 from the first control circuit 20 mean that the horizontal variation of the composite video signal is greater than the vertical variation thereof, the multiplexer 36 selects the color signal from the 2H comb filter 31 as the first color signal. When the first and second control signals T1 and T2 from the first control circuit 20 mean that the correlation of the three lines of the color signal is low vertically and high horizontally, the multiplexer 36 selects the color signal from the band pass filter 33 as the first color signal. In other cases, the multiplexer 36 selects the color signal from the adaptive 1H comb filter 35 as the first color signal.

In detail, the first and second control signals T1 and T2 are applied from the operation units 23 and 24 in the first control circuit 20 to the multiplexer 36 in the first color signal detecting circuit 30. In response to the first and second control signals T1 and T2, the multiplexer 36 selects the color signal A0 from the 2H comb filter 31 when the horizontal variation of the composite video signal is greater than the vertical variation thereof, the color signal B0 from the band pass filter 33 when the correlation of the three lines of the color signal is low vertically and high horizontally and the color signal C0 from the adaptive 1H comb filter 35 in other cases.

The color signal A0 from the 2H comb filter 31 in the first color signal detecting circuit 30 is also applied to the band pass filter of the second color signal detecting circuit 40. The band pass filter functions to suppress the cross color phenomenon of the color signal A0 from the 2H comb filter 31 and outputs the resultant color signal as the second color signal.

By the way, the composite video signal Va is also applied to the vertical variation detecting circuit 51 in the second control circuit 50. In the vertical variation detecting circuit 51, the composite video signal Va is sequentially delayed by 1H by the 1H delays 511 and 512. Then, the composite video signal Va is subtracted from an output signal Vb from the 1H delay 511 by the subtracter 513 and an output signal Vc from the 1H delay 512 is subtracted from the output signal Vb from the 1H delay 511 by the subtracter 514. The subtracter 515 subtracts the output signal Vc from the 1H delay 512 from the composite video signal Va and then outputs the resultant signal Va−Vc. Also, the output signals Vb−Vc and Vb−Va from the subtracters 513 and 514 are added in the adder 516, which then outputs the resultant signal 2Vb−Vc−Va. The absolute value detectors 517 and 518 detect absolute values A5 and A6 of the output signals Va−Vc and 2Vb−Vc−Va from the subtracter 515 and the adder 516.

The output signal Vb from the 1H delay 511 is also sequentially delayed by 2-sample by the 2-sample delays 531 and 532 in the horizontal variation detecting circuit 53. The subtracter 533 subtracts the output signal Vb from the 1H delay 511 from an output signal Vd from the 2-sample delay 531 and then outputs the resultant signal Vd−Vb. Also, the subtracter 534 subtracts an output signal Ve from the 2-sample delay 532 from the output signal Vd from the 2-sample delay 531 and then outputs the resultant signal Vd−Ve. Then, the adder 535 adds the output signals Vd−Vb and Vd−Ve from the subtracters 533 and 534 and outputs the resultant signal 2Vd−Vb−Ve.

Also, the subtracter 536 subtracts the output signal Ve from the 2-sample delay 532 from the output signal Vb from the 1H delay 511 and then outputs the resultant signal Vb−Ve. Then, the absolute value detectors 537 and 538 detects absolute values A7 and A8 of the output signals 2Vd−Vb−Ve and Vb−Ve from the adder 535 and the subtracter 536.

The output signals A5 and A6 from the absolute value detectors 517 and 518 in the vertical variation detecting circuit 51 are compared with each other by the operation unit 52. Also, the output signals A7 and A8 from the absolute value detectors 537 and 538 in the horizontal variation detecting circuit 53 are compared with each other by the operation unit 54.

Upon receiving the output signals A5 and A6 from the absolute value detectors 517 and 518, the operation unit 52 calculates $A6 > W5 \times A5 + Y5$, where W5 is a weighted value for A5, and then outputs a control signal T3 in accordance with the calculated result. Also, upon receiving the output signals A7 and A8 from the absolute value detectors 537 and 538, the operation unit 54 calculates $A8 > W7 \times A7 + Y7$, where W7 is a weighted value for A7, and then outputs a control signal T4 in accordance with the calculated result. The control signals T3 and T4 from the operation units 52 and 54 are ANDed in the AND gate 55, which then outputs the ANDed signal as the third control signal.

Figure 7A:
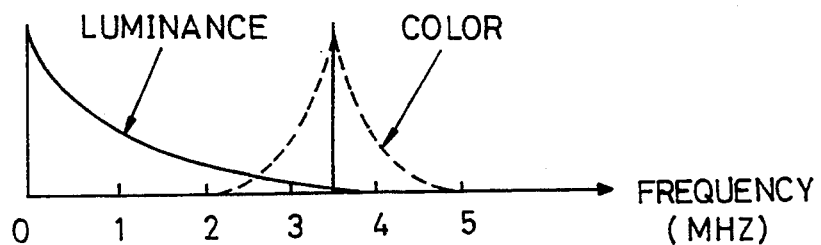
FIGS. 7A and 7B are amplitude-frequency diagrams illustrating frequency spectra of a composite video signal in a NTSC television broadcasting system, respectively.
Figure 7B:
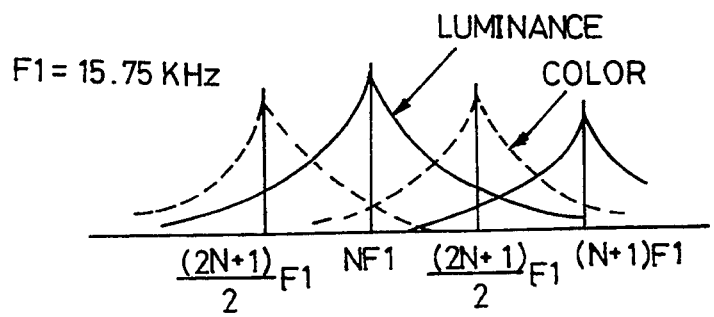

Here, see a distribution characteristic of frequency spectra of a color television broadcasting signal of the NTSC system with reference to FIGS. 7A and 7B. In a gross structure in FIG. 7, there is increased an interference between the spectra of the luminance and color signals when the video signal is greatly varied horizontally, since a spectrum spread phenomenon of the luminance and color signals is increased. In a fine structure in FIG. 7B in which overlapped areas of the spectra of the luminance and color signals in the cross structure in FIG. 7 are enlarged, there is increased the interference between the spectra of the luminance and color signals when the video signal is greatly varied vertically, since the spectrum spread phenomenon of the luminance and color signals is increased.

Therefore, utilizing the frequency characteristics shown in FIGS. 7A and 7B, the vertical, horizontal and diagonal variations of the video signal can be discriminated.

Figure 8A:
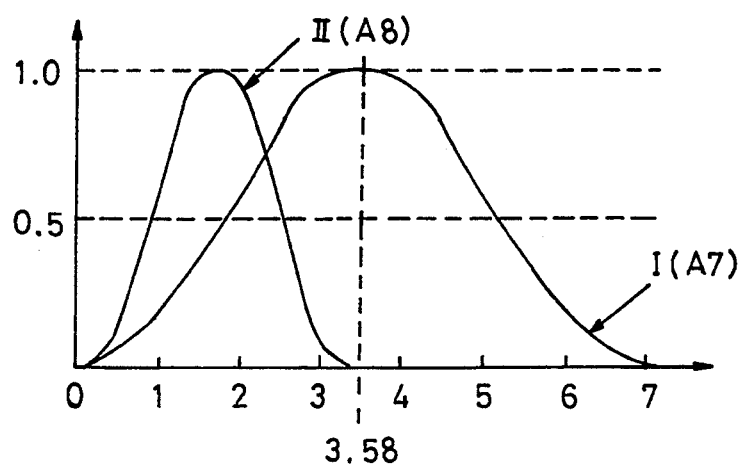
Figure 8A:
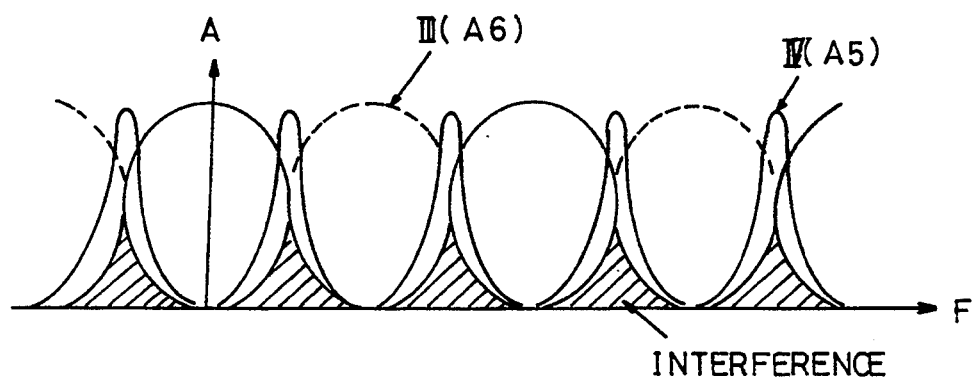

In FIG. 8A the reference numeral I designates a frequency characteristic of the color signal A7 transferred through the 2-sample delays 531 and 882, the subtracter 533, the adder 885 and the absolute value detector 537 and the reference numeral II designates a frequency characteristic of the color signal A8 transferred through the 2-sample delays 531 and 532, the subtracter 536 and the absolute value detector 538.

In the case of comparing the frequency characteristics shown in FIG. 8A to the gross structure shown in FIG. 7A, it can be seen that the color signal A7 represents an interference energy between the luminance and color signals and the color signal A8 represents an energy of the color signal. Therefore, the equation $A8 < WT \times A7 + Y7$ calculated by the operation unit 54 means that the color signal has a small amplitude or the composite video signal is greatly varied horizontally.

In FIG. 8B, the reference numerals III and IV designate frequency characteristics of the color signals A5 and A6, respectively. In the case of comparing the frequency characteristics shown in FIG. 8B to the fine structure shown in FIG. 7B, it can be seen that the color signal A5 represents the interference energy between the luminance and color signals and the color signal A6 represents the energy of the color signal. Therefore, the equation $A6 > W5 \times A5 + Y5$ calculated by the operation unit 52 means that the composite video signal is greatly varied vertically.

Also, in the case where the output signal from the operation unit 52 satisfies the equation $A6 < W5 \times A5 + Y5$ and the output signal from the operation unit 54 satisfies the equation $A8 < W7 \times A7 + Y7$, the composite video signal has the diagonal variation or the color signal thereof has a small amplitude. In this case, a picture quality is greatly influenced by the cross color phenomenon of the first color signal from the first color signal detecting circuit 30 rather than a resolution of the second color signal from the second color signal detecting circuit 40. Accordingly, the multiplexer 60 is controlled depending on the output signal from the AND gate 55 which ANDs the output signals from the operation units 52 and 54.

Namely, when the output signals from the operation units 52 and 54 are $A6 > W5 \times A5 + Y5$ and $A8 < W7 \times A7 + Y7$, the multiplexer 60 selects the second color signal from the second color signal detecting circuit 40. On the contrary, when the output signals from the operation units 52 and 54 are $A6 < W5 \times A5 + Y5$ and $A8 > W7 \times A7 + Y7$, the multiplexer 60 selects the first color signal from the first color signal detecting circuit 30.

The first color signal from the first color signal detecting circuit 30 is also applied to the subtracter 70, which subtracts the first color signal from the composite video signal and outputs the resultant luminance signal Y. Then, the delay 80 delays the luminance signal Y from the subtracter 70 by a predetermined period of time to match it with the color signal C from the multiplexer 60.

As hereinbefore described, according to the present invention, when the color signal of the composite video signal has a large amplitude and no diagonal variation, the first color signal from the first color signal detecting circuit is selected to suppress the cross luminance phenomenon of the luminance signal from the composite video signal. Also, in the case where the color signal of the composite video signal has a small amplitude and the diagonal variation, the second color signal from the second color signal detecting circuit is selected to suppress the cross color phenomenon of the color signal from the composite video signal. Therefore, a definition of the picture can be obtained by suppressing the cross color phenomenon of the color signal and the cross luminance phenomenon of the luminance signal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for separating luminance and color signals from a composite video signal, comprising:
   first control means for detecting vertical and horizontal variations of the composite video signal and outputting first and second control signals;
   first color signal detecting means for detecting a first color signal frown the composite video signal in response to the first and second control signals from said first control means;
   second color signal detecting means for suppressing a cross color phenomenon of the first color signal from the composite video signal to form the second color signal;
   second control means for detecting an amplitude and a diagonal variation of the first color signal in the composite video signal to form a third control signal;
   multiplexing means responsive to the third control signal from said second control means for selecting the first color signal or said second color signal in response to the third control signal;
   subtracting means for subtracting the first color signal from said first color signal detecting means from the composite video signal and outputting a luminance signal; and
   delay means for delaying the luminance signal from said subtracting means to match the luminance signal with the color signal from said multiplexing means.

2. An apparatus for separating luminance and color signals from a composite video signal, as set forth in claim 1, wherein said first control means includes:
   a vertical variation detecting circuit for detecting the vertical variation of the composite video signal;
   a horizontal variation detecting circuit for detecting the horizontal variation of the composite video signal;
   a first operation unit for receiving first output signals from said vertical and horizontal variation detecting circuits and for detecting whether the vertical variation of the composite video signal is smaller than the horizontal variation thereof and responsively outputting the first control signal; and
   a second operation unit for receiving second output signals from said vertical and horizontal variation detecting circuits and for detecting whether the horizontal variation of the composite video signal is smaller than the vertical variation thereof and responsively outputting the second control signal.

3. An apparatus for separating luminance and color signals from a composite video signal, as set forth in claim 1, wherein said first color signal detecting means includes:
   a 2H comb filter for comb-filtering the composite video signal by 2H and outputting a 2H color signal;
   first to third band pass filters, each for extracting a frequency component around a chrominance subcarrier from a corresponding one of the composite video signal, a 1H delayed composite video signal and a 2H delayed composite video signal and a filtered signal, a 1H filtered signal, and a 2H filtered signal, respectively;
   an adaptive 1H comb filter for outputting a 1H comb filtered signal from one of the filtered signals from said first to third band pass filters;
   a multiplexer responsive to the first and second control signals from said first control means for selecting the 2H color signal from said 2H comb filter when the vertical variation of the composite video signal is smaller than the horizontal variation thereof, for selecting the 1H filtered signal from said second band pass filter when the horizontal variation of the composite video signal is smaller than the vertical variation thereof or when a correlation of three lines is low vertically and high horizontally and for selecting the 1H comb filtered signal from said adaptive 1H comb filter in other cases, and outputting the selected color signal as the first signal; and
   first and second delays for delaying the 2H color signal from said 2H comb filter and the 2H filtered signal from said second band pass filter, respectively, to match them with the 1H comb filtered signal from said adaptive 1H comb filter.

4. An apparatus for separating luminance and color signals from a composite video signal, as set forth in claim 3, wherein said second color signal detecting means includes:
   a band pass filter for suppressing the cross color phenomenon of the color signal from said 2H comb filter in said first color signal detecting means and outputting the resultant color signal as the second color signal.

5. An apparatus for separating luminance and color signals from a composite video signal, as set forth in claim 1, wherein said second control means includes:
   a vertical variation detecting circuit for detecting the vertical variation of the composite video signal and responsively providing first and second vertical output signals:
   a first operation unit for detecting the amplitude of the color signal being vertically varied, in response to said first and second vertical output signals from said vertical variation detecting circuit;
   a horizontal variation detecting circuit for detecting the horizontal variation of the composite video signal and responsively providing first and second horizontal output signals;
   a second operation unit for detecting the amplitude of the color signal being horizontally varied, in response to said first and second horizontal output signals from said horizontal variation detecting circuit; and an AND gate for ANDing output signals from said first and second operation units and outputting the ANDed signal as the third control signal.

6. An apparatus for separating luminance and color signals from a composite video signal, as set forth in claim 2, wherein said vertical variation detecting circuit includes:

first and second 1H delays for sequentially delaying the composite video signal by 1H;

a first subtracter for subtracting an output signal from said first 1H delay from the composite video signal;

a second subtracter for subtracting an output signal from said second 1H delay from the output signal from said first 1H delay;

a third subtracter for subtracting the output signal from said second 1H delay from the composite video signal;

first to third absolute value detectors, each for detecting an absolute value of a corresponding one of output signals from said first to third subtracters, said third absolute value detector providing the first output signal to said first operation unit; and a minimum value filter for filtering a smaller one of output signals from said first and second absolute value detectors, said minimum value filter providing the second output signal to said second operation unit.

7. An apparatus for separating luminance and color signals from a composite video signal, as set forth in claim 2, wherein said horizontal variation detecting circuit includes:

first and second 2-sample delays for sequentially delaying a 1H delayed composite video signal by 2-sample;

a first subtracter for subtracting an output signal from said first 2-sample delay from the 1H delayed composite video signal;

a second subtracter for subtracting an output signal from said second 2-sample delay from the output signal from said first 2-sample delay;

a third subtracter for subtracting the output signal from said second 2-sample delay from the 1H delayed composite video signal;

first to third absolute value detectors, each for detecting an absolute value of a corresponding one of output signals from said first to third subtracters, said third absolute value detector providing the first output signal to said first operation unit; and a maximum value filter for filtering a larger one of output signals from said first and second absolute value detectors, said maximum value filter providing the second output signal to said second operation unit.

8. An apparatus for separating luminance and color signals from a composite video signal, as set forth in claim 5, wherein said vertical variation detecting circuit includes:

first and second 1H delays for sequentially delaying the composite video signal by 1H;

a first subtracter for subtracting an output signal from said first 1H delay from the composite video signal;

a second subtracter for subtracting an output signal from said second 1H delay from the output signal from said first 1H delay;

an adder for adding output signals from said first and second subtracters;

a third subtracter for subtracting the output signal from said second 1H delay from the composite video signal; and first and second absolute value detectors, each for detecting an absolute value of a corresponding one of output signals from said third subtracter and said adder, said first absolute value detector providing the first output signal to said first operation unit, said second absolute value detector providing the second output signal to said first operation unit.

9. An apparatus for separating luminance and color signals from a composite video signal, as set forth in claim 5, wherein said horizontal variation detecting circuit includes:

first and second 2-sample delays for sequentially delaying a 1H delayed composite video signal by 2-sample;

a first subtracter for subtracting an output signal from said first 2-sample delay from the 1H delayed composite video signal;

a second subtracter for subtracting an output signal from said second 2-sample delay from the output signal from said first 2-sample delay;

adder for adding output signals from said first and second subtracters;

a third subtracter for subtracting the output signal from said second 2-sample delay from the 1H delayed composite video signal; and first and second absolute value detectors, each for detecting an absolute value of a corresponding one of output signals from said adder and said third subtracter, said first absolute value detector providing the first output signal to said second operation unit, said second absolute value detector providing the second output signal to said second operation unit.

* * * * *